(12) United States Patent
Chang

(10) Patent No.: US 6,856,750 B2
(45) Date of Patent: *Feb. 15, 2005

(54) OPTICAL VARIABLE ATTENUATOR ASSEMBLY

(75) Inventor: Chih-Chiang Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 132 days.

This patent is subject to a terminal disclaimer.

(21) Appl. No.: 10/099,621

(22) Filed: Mar. 15, 2002

(65) Prior Publication Data
US 2003/0103758 A1 Jun. 5, 2003

(30) Foreign Application Priority Data
Dec. 5, 2001 (TW) ..................... 90221150 U

(51) Int. Cl.[7] ............................. G02B 6/00
(52) U.S. Cl. ..................... 385/140; 359/234
(58) Field of Search ............... 385/140, 134, 385/32, 77–78

(56) References Cited

U.S. PATENT DOCUMENTS

| 5,245,683 A | * | 9/1993 | Belenkiy et al. | ............... 385/72 |
| 5,734,778 A | * | 3/1998 | Loughlin et al. | ........... 385/140 |
| 6,293,710 B1 | * | 9/2001 | Lampert et al. | .............. 385/78 |
| 6,512,878 B1 | * | 1/2003 | Chang | ........................ 385/140 |
| 6,652,156 B2 | * | 11/2003 | Shinagawa et al. | ........... 385/78 |

* cited by examiner

Primary Examiner—Brian Healy
Assistant Examiner—Eric Wong
(74) Attorney, Agent, or Firm—Wei Te Chung

(57) ABSTRACT

A variable attenuator assembly (1) includes a variable attenuating connector (VAC) (11), a coupling sleeve (12), and a second plug-type connector (13). The VAC includes a housing (20) and an attached double screw mechanism (110). The double screw mechanism is finely adjustable because it uses an adjusting knob (40) having an external thread (401) and an internal thread (402) with different screw pitches. The external thread engages with an internally threaded bore (303) of a connecting nut (30) attached to the housing. The internal thread engages with outer threading (602) on a ferrule holder (60) received in the adjusting knob. When the adjusting knob is rotated, the knob moves in one direction, and the ferrule holder is moved in the opposite direction, the total distance of ferrule holder movement relative to the housing being proportional to the difference between the screw pitches.

17 Claims, 7 Drawing Sheets

OPTICAL VARIABLE ATTENUATOR ASSEMBLY

BACKGROUND OF THE INVENTION

1. Field of the Invention

The present invention generally relates to the field of optical attenuators, and more particularly to variable optical attenuators featuring fine adjustment of attenuation.

2. The Related Arts

Optical attenuators are widely used to control the intensity of optical signals transmitted in an optical network. Optical attenuators are classified as fixed attenuators or variable attenuators. A fixed attenuator provides a fixed attenuation of optical signals, while a variable attenuator allows adjustment of the attenuation of the optical signals. A variety of variable attenuators are available, among which the most commonly used operate by separating ends of coaxially aligned optical fibers to form a gap therebetween. The amount of attenuation achieved by this kind of attenuator is, in general, dependent upon the distance between the ends of the two optical fibers. Thus, the attenuation can be controlled by axially displacing one fiber relative to the other to change the distance between the fibers.

One design for axially displacing optical fibers uses plug-type connectors carrying a first fiber and a second fiber and mating with a coupling device. Attenuation is performed by axially displacing the first fiber relative to the second fiber. An example is shown in U.S. Pat. No. 5,734,778 wherein a screw mechanism is attached to a ferrule carrying the first optical fiber. The screw mechanism converts the turning of a nut into a linear displacement of the ferrule. This device, however, can not be finely adjusted. The amount of linear displacement is, in general, dependent upon the screw pitch. Theoretically, a decrease in screw pitch will lead to finer adjustment. However, physical limitations prevent the screw pitch from being decreased beyond certain limits.

It is thus desirable to provide a variable optical attenuator wherein an attenuation can be more finely adjusted, thereby overcoming the above mentioned problem.

SUMMARY OF THE INVENTION

Accordingly, an object of the present invention is to provide a variable attenuating connector providing finer attenuation adjustment.

Another object of the present invention is to provide a variable attenuating connector employing a double screw mechanism providing finer attenuation adjustment.

A further object of the present invention is to provide a plug-type variable attenuating connector providing finer attenuation adjustment.

To achieve the above objects, a variable attenuating connector (VAC) in accordance with the present invention is embodied in the form of a plug-type optical connector carrying a first fiber. This VAC is part of a variable attenuator assembly, which also includes a coupling sleeve and a second plug-type connector with a second fiber. Both plug-type connectors are connected to the coupling sleeve so that the first and second fibers are held in coaxial alignment. Attenuation of optical signals traveling between the first and second fibers is achieved by varying a distance separating ends of the fibers from each other.

The VAC comprises a stationary housing defining a longitudinally extending housing bore. A double screw mechanism is attached to a rear end of the housing. The double screw mechanism includes an elongate, tube-shaped ferrule holder accommodating the first fiber in its central bore and forming a first threaded section on its outer surface. The ferrule holder seats a ferrule in its forward end, the first fiber being firmly held in the ferrule. A tubular adjusting knob forms an inner threaded section of a first screw pitch on its internal surface and an outer threaded section of a second screw pitch on its external surface. The first and second screw pitches are different. A connecting nut of the double screw mechanism is held stationary relative to the stationary housing and has a second threaded section formed on the surface of an inner bore. The adjusting knob is threaded onto the ferrule holder, the first threaded section of the ferrule holder threadedly engaging with the inner threaded section of the adjusting knob. The adjusting knob is also partially screwed into the connecting nut, the second threaded section of the connecting nut threadedly engaging with the outer threaded section of the adjusting knob. The ferrule holder is thus attached to the stationary housing with the ferrule holder extending through the housing bore and the ferrule extending a short distance forward of the stationary housing. When the adjusting knob is rotated, the ferrule holder moves relative to the knob in a first direction a first distance corresponding to the first screw pitch, and the knob moves relative to the stationary housing in a second direction opposite to the first direction a second distance corresponding to the second screw pitch. The linear displacement of the ferrule holder (and the first fiber) relative to the stationary housing is the difference between the first distance and the second distance.

Other objects, advantages and novel features of the invention will become more apparent from the following detailed description when taken in conjunction with the accompanying drawings.

DETAILED DESCRIPTION OF THE PREFERRED EMBODIMENT

Figure 1:
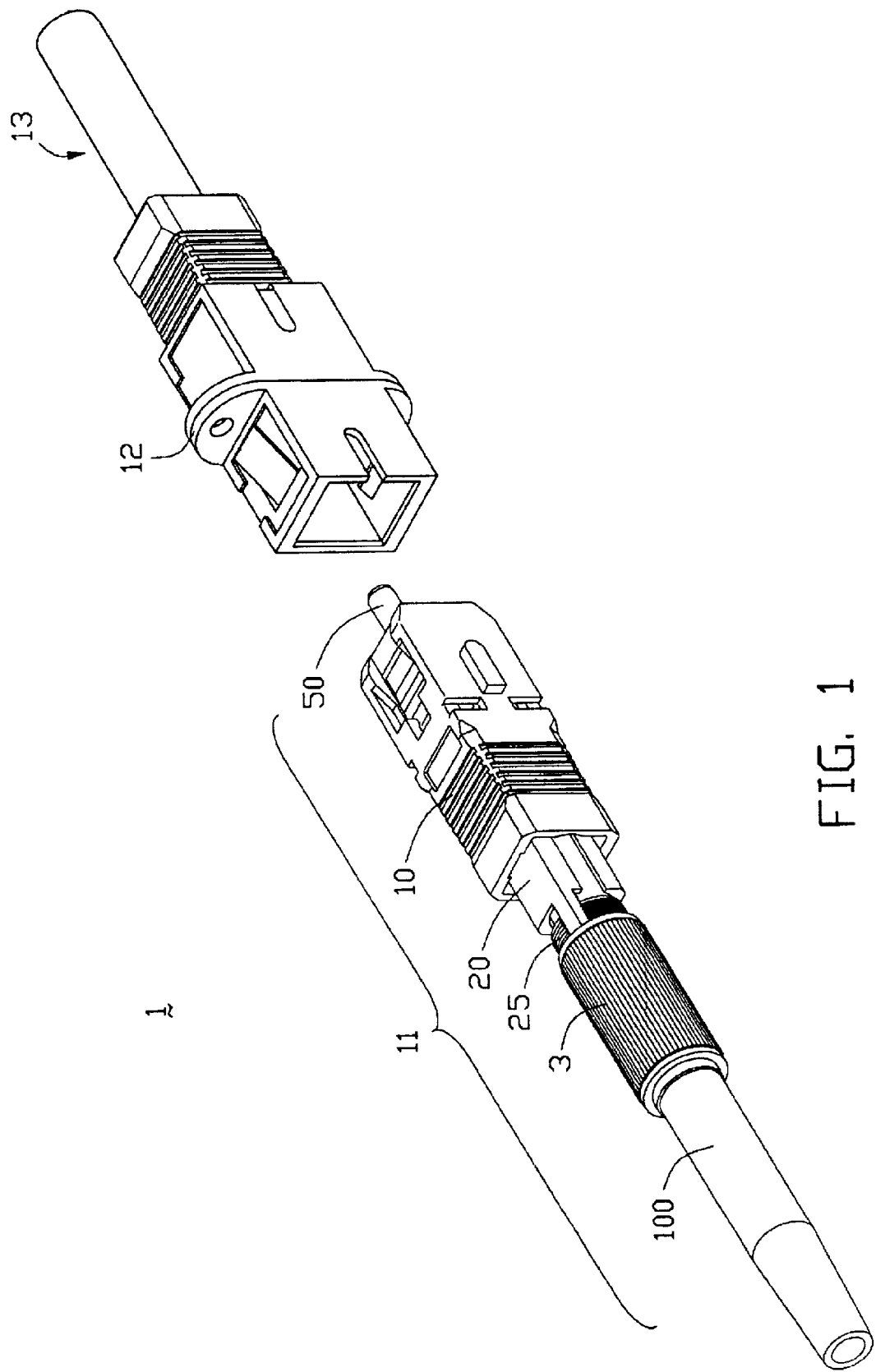
FIG. 1 is a perspective view of a variable attenuator assembly constructed in accordance with the present invention, showing a variable attenuating connector unmated with a coupling sleeve.
Figure 7:
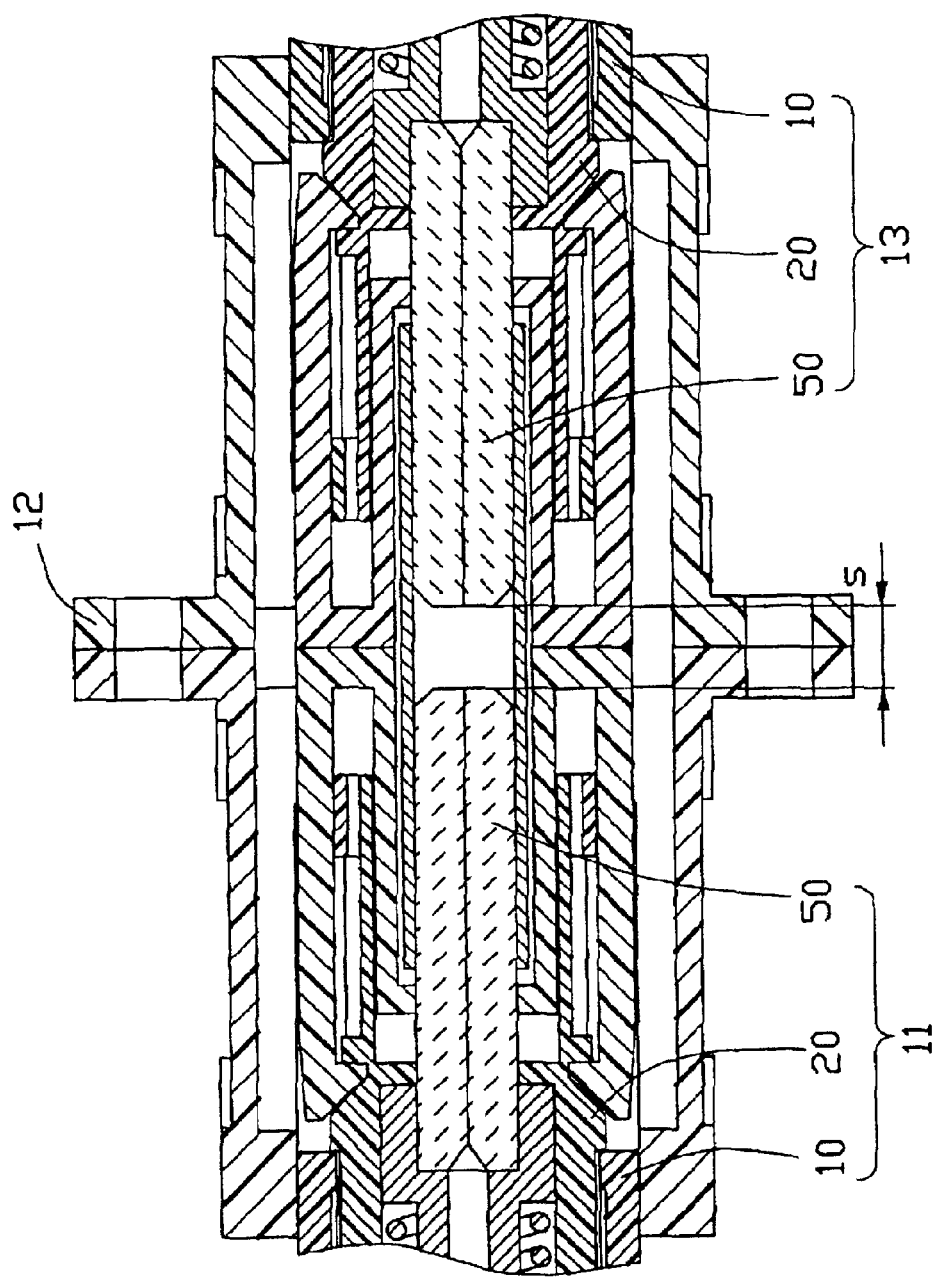
FIG. 7 is an assembled, partial, cross-sectional view of the variable attenuator assembly of FIG. 1.

With reference to the drawings, and in particular to FIGS. 1 and 7, an optical variable attenuator assembly constructed in accordance with the present invention, generally designated with reference numeral 1, comprises a variable attenuating connector (VAC) 11, a coupling sleeve 12 and a second plug-type optical connector 13. The VAC 11 is embodied in the form of a first plug-type optical connector carrying a first optical fiber (not shown). The VAC 11 is designed to mate with the coupling sleeve 12, which also mates with the second plug-type optical connector 13 carrying a second optical fiber (not shown) whereby the first and second optical fibers are coaxially aligned with each other for transmission of optical signals. Ends of the first and second optical fibers, opposed to each other, can be separated from each other a distance (S) (reference FIG. 7), adjustable by mechanisms of the VAC 11.

Figure 2:
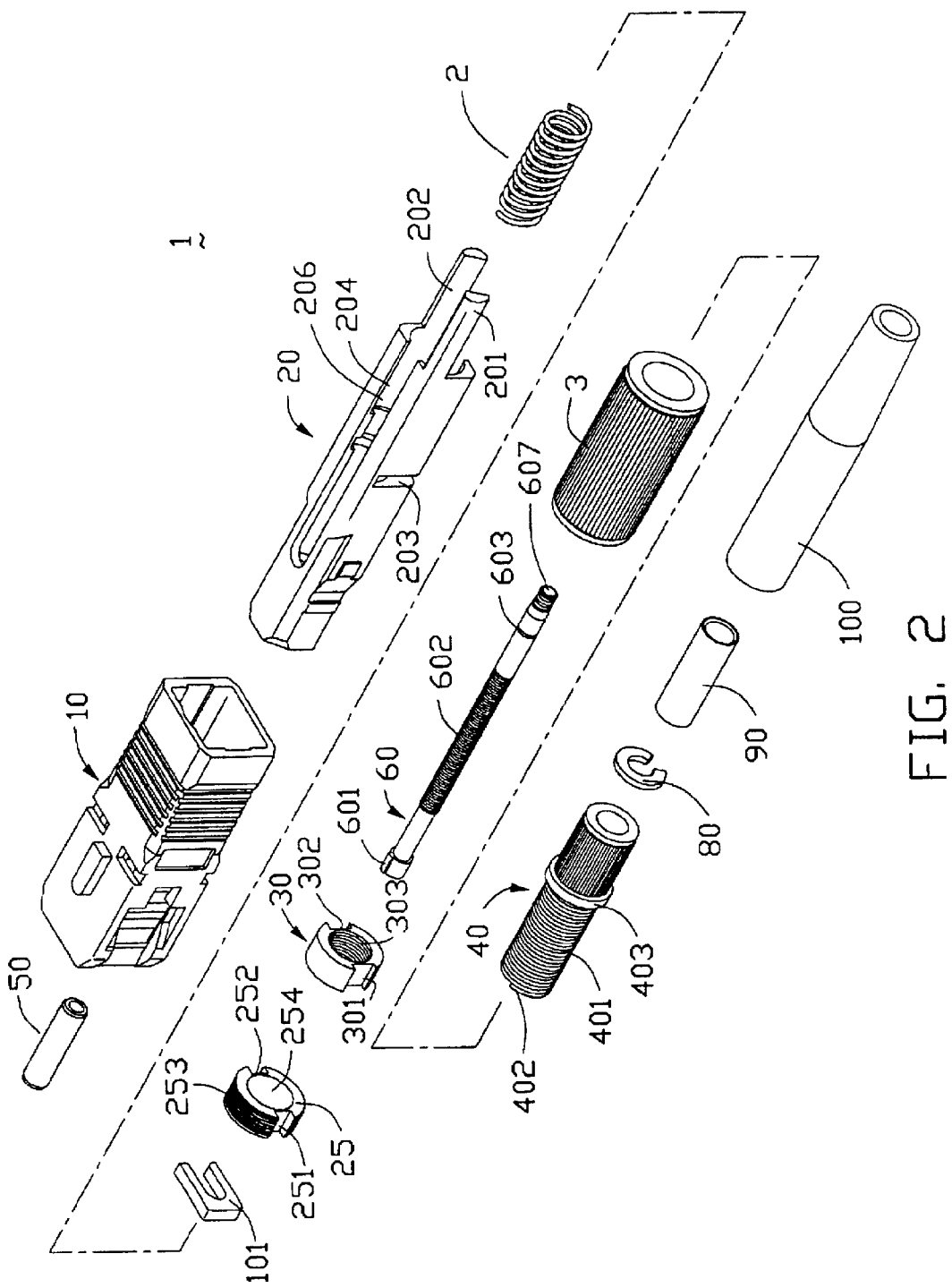
FIG. 2 is an exploded view of the variable attenuating connector of FIG. 1.
Figure 3:
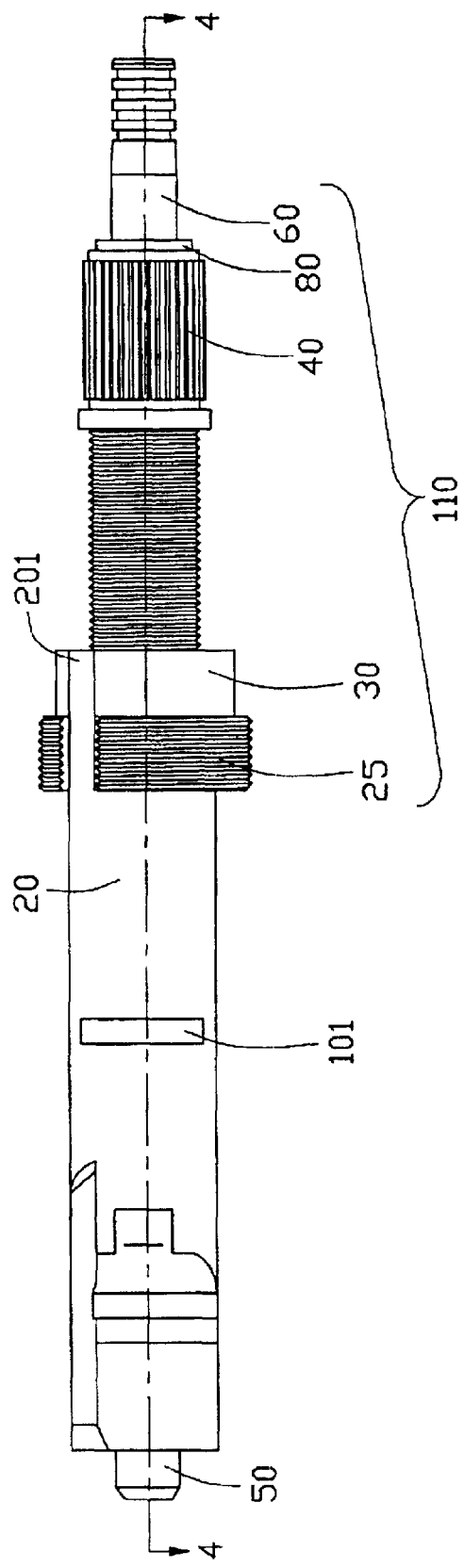
FIG. 3 is an assembled view of the variable attenuating connector of FIG. 2, without an external housing, a deformable tube, a protective shield, or a strain relief.
Figure 4:
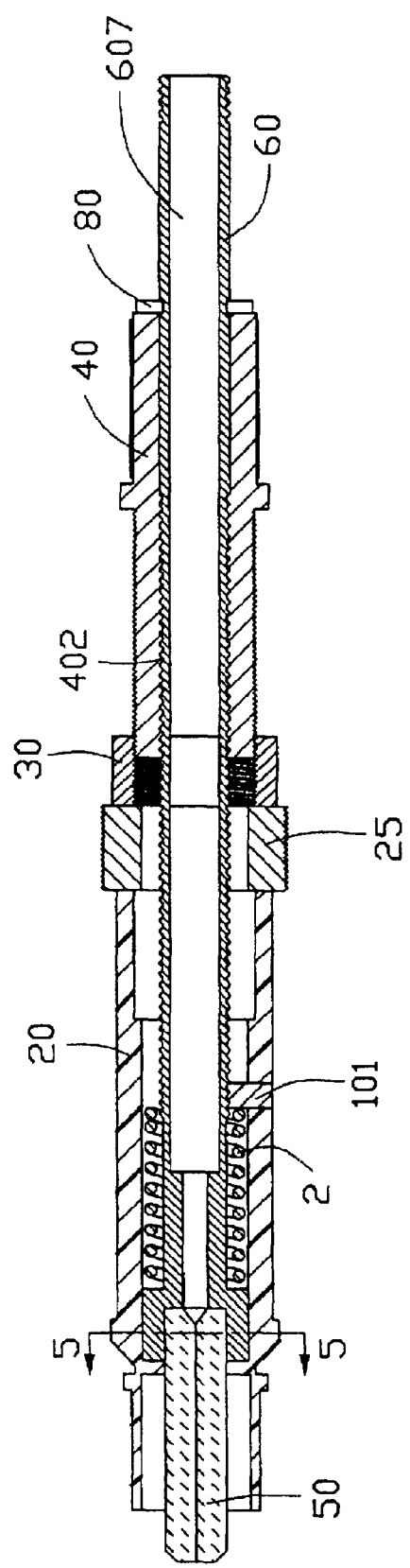
FIG. 4 is a cross-sectional view taken along line 4—4 of FIG. 3.

Referring to FIGS. 2, 3 and 4, the VAC 11 of the present invention comprises a ferrule 50, an external housing 10, an internal housing 20, a U-clip 101, a helical spring 2, a protective sheath 3, a deformable tube 90, a strain relief 100 and a double screw mechanism 110 (see FIG. 3). The internal housing 20 has a front end (not labeled) to which the external housing 10 is connected, and a rear end (not labeled) to which the double screw mechanism 110 is connected. The internal housing 20 defines a central bore 206 extending along its longitudinal axis, two holding beams 201, 202 extending from the rear end, a stopping slot 203 in the center accommodating the U-clip 101, and two keyways 204 parallel to the longitudinal axis.

The double screw mechanism 110 comprises a mounting screw 25, a connecting nut 30, a ferrule holder 60, an adjusting knob 40 and a C-clip 80. The mounting screw 25 defines a central bore 254, two opposite externally-threaded sections 253 at the circumference and two opposite grooves 251, 252 between the two externally-threaded sections 253.

The connecting nut 30 defines an internally-threaded bore 303 and two opposite grooves 301, 302 at the circumference similar to the grooves 251, 252. Please note that in FIG. 4, the internally-threaded bore 303 (not labeled in FIG. 4) shows up as a solid, dark mass. This is because the threading is shown on its actual scale, but the lines used in the drawing were not fine enough to resolve the individual thread lines and instead ran together.

Figure 6:
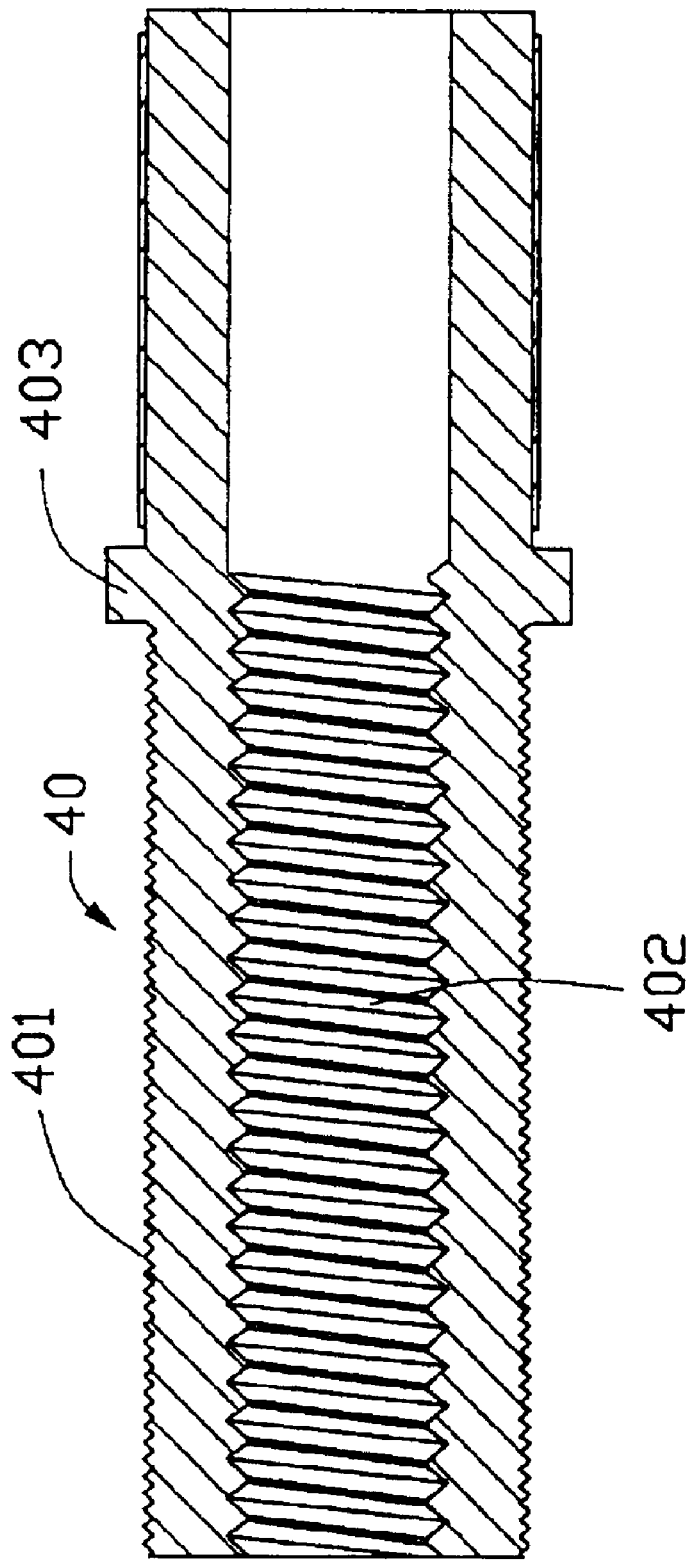
FIG. 6 is a cross-sectional view of an adjusting knob of the variable attenuating connector of FIG. 2.

As shown in FIG. 6, the adjusting knob 40 is tubular in shape having a bore (not labeled) along its longitudinal axis and a circumferential rib 403. An internal thread 402 is formed on an internal surface of the bore (not labeled), and an external thread 401 is formed on an external surface between the circumferential rib 403 and a forward end (not labeled) of the adjusting knob 40. The internal thread 402 has a first screw pitch and the external thread 401 has a second screw pitch, the two screw pitches being different.

The ferrule holder 60 defines a central bore 607 for receiving the first optical fiber, two stoppers 601 on an enlarged front end (not labeled), an externally-threaded section 602 in a center of an external surface and a circumferential slot 603 in a rear end (not labeled) for receiving and retaining the C-clip 80.

Figure 5:
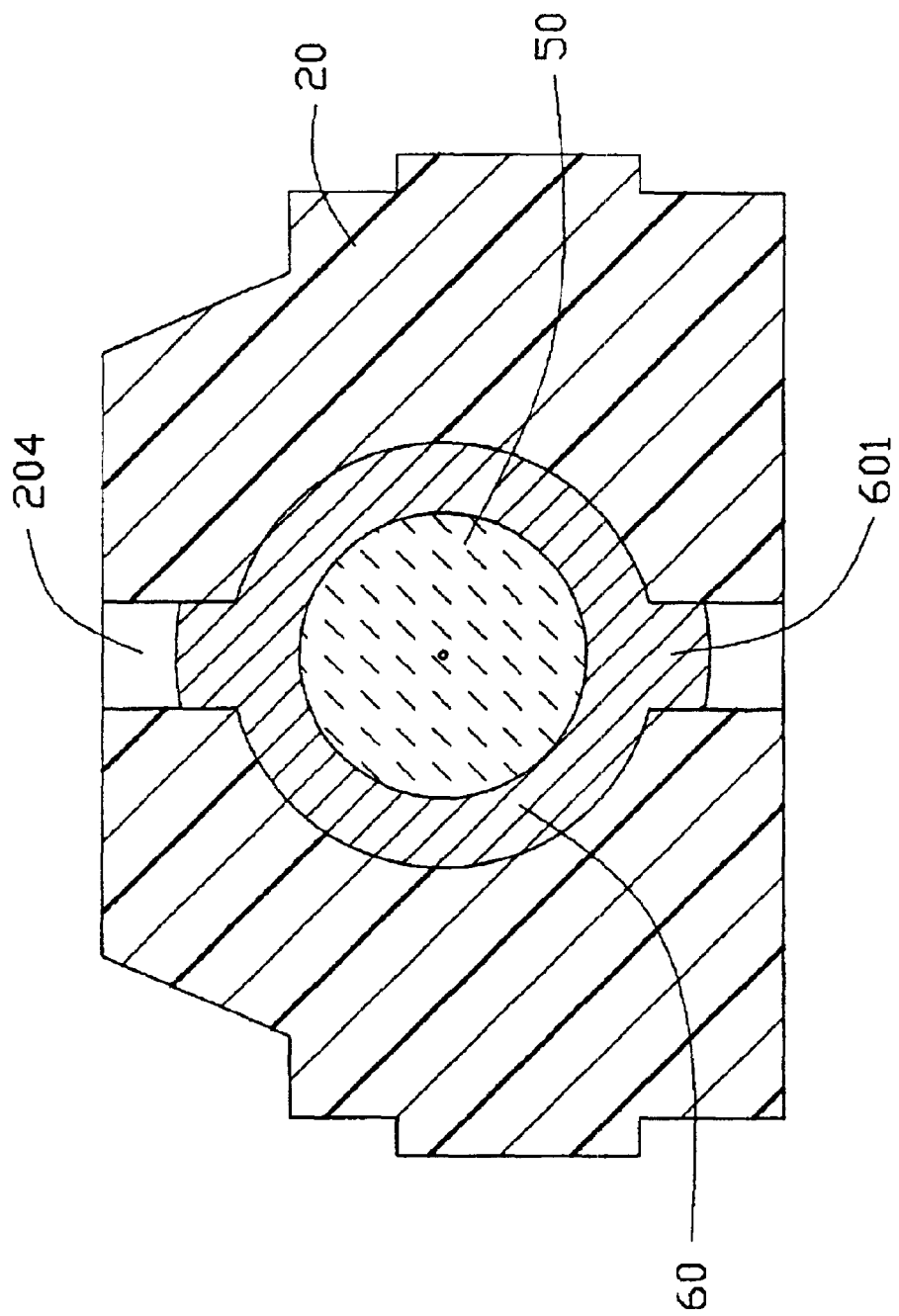
FIG. 5 is a cross-sectional view taken along line 5—5 of FIG. 4.

Referring to FIGS. 2, 3 and 5, in assembly, the helical spring 2 slides over the ferrule holder 60 and is pushed forward to the front end of the ferrule holder 60. The mounting screw 25, the connecting nut 30 and the adjusting knob 40 in turn receive the ferrule holder 60 with the externally-threaded section 602 threadedly engaging with the internal thread 402 of the knob 40, and with the knob 40 being partially received in the connecting nut 30 with the external thread 401 of the knob 40 threadedly engaging with the internally-threaded bore 303 of the connecting nut 30. The C-clip 80 is received in the circumferential slot 603 of the ferrule holder 60 for limiting the rearward movement of the adjusting knob 40. The ferrule holder 60 is inserted into the central bore 206 of the internal housing 20, with the front end thereof located in the internal housing 20 and the stoppers 601 engaging in the keyways 204 of the internal housing 20 to prevent the ferrule holder 60 from rotating relative to the internal housing 20. The mounting screw 25 and the connecting nut 30 are fixed on the rear end of the internal housing 20 by the four grooves 251, 252, 301, 302 engagingly receiving the two holding beams 201, 202 of the internal housing 20. The U-clip 101 is inserted into the stopping slot 203 and is fitted around the ferrule holder 60 with the helical spring 2 disposed between the enlarged front end (not labeled) of the ferrule holder 60 and the U-clip 101. The protective sheath 3 is preferably attached to the rear end of the internal housing 20 by engaging with the externally-threaded sections 253 of the mounting screw 25 for shielding and preventing the double screw mechanism 110 from being accidentally actuated. The external housing 10 slides over the front end of the internal housing 20. The ferrule 50 is accommodated in a recess (not shown) defined in the enlarged front end of the ferrule holder 60. The ferrule 50 partially extends beyond the external housing 10 for insertion into the coupling sleeve 12 during mating.

When being assembled to the first optical fiber (not shown), the fiber is inserted sequentially through the strain relief 100, the deformable tube 90, and through the central bore 607 of the ferrule holder 60. A front end of the fiber is inserted through the ferrule 50. The ferrule 50 is then seated in the recess (not shown) of the enlarged front end of the ferrule holder 60. The deformable tube 90 and the strain relief 100 are attached to the rear end of the ferrule holder 60. The deformable tube 90 can be crimped around the rear end of the ferrule holder 60 and the first optical fiber (not shown). The deformable tube 90 is received in the strain relief 100 for fixation and protection of the first optical fiber.

In use, the ferrule holder 60 moves forward and rearward along its longitudinal axis with respect to the adjusting knob 40 when the adjusting knob 40 is rotated. The external thread 401 and the internal thread 402 of the adjusting knob 40 are arranged in such a way that when the knob 40 makes a turn, the holder 60 is linearly moved with respect to the knob 40 in a predetermined first direction a distance corresponding to the pitch of the internal thread 402, while the knob 40 is linearly moved with respect to the connecting nut 30 in an opposite second direction a distance corresponding to the pitch of the external thread 401. Thus, a total displacement of the holder 60 and thus the first optical fiber carried therein is equal to the pitch of the internal thread 402 minus the pitch of the external thread 401. Taking 0.25 mm and 0.35 mm as examples of the pitches of the external thread 401 and internal thread 401, the displacement induced on the holder 60 is 0.35 mm−0.25 mm=0.10 mm when the knob 40 makes a full turn. This gives a finer resolution in adjusting the distance (S) between the first and second optical fibers (reference FIG. 7) and thus improves upon a variable optical attenuator of the prior art.

The second plug-type optical connector 13 need not have a double screw mechanism 110 or other adjusting mechanism for the optical variable attenuator assembly 1 to be fully functional. Normally, the second plug-type optical connector 13 of FIG. 1 will have a second optical fiber (not shown) stationary with respect to the second plug-type optical connector 13. Please also note that other plug-receptacle combinations and configurations are meant to be encompassed by the present invention. For instance, the coupling sleeve 12 and second plug-type optical connector 13 could be replaced by a receptacle connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A variable attenuator assembly for attenuating optical signals transmitted between a first and a second optical fibers, comprising:
   a plug-type connector terminating the second optical fiber;
   a coupling sleeve open at two opposite ends; and
   a variable attenuating connector (VAC) terminating the first optical fiber, comprising:
      a stationary housing defining a longitudinally extending bore and having a rear end;
      a connecting member attached to the rear end of the stationary housing and defining an internally-threaded bore;
      a tubular knob having an external thread of a first screw pitch and an internal thread of a second screw pitch, the first and second screw pitches being different from each other, the tubular knob being partially received in the connecting member with the external thread of the knob mating with the internally-threaded bore of the connecting member; and
      a ferrule holder defining a central bore adapted to receive and retain an optical fiber therein, the holder being received in the tubular knob and the stationary housing and having external thread mating with the internal thread of the knob;
   wherein rotating the knob induces a first linear displacement of the knob with respect to the connecting member and the stationary housing and a second linear displacement of the holder with respect to the knob, the first linear displacement being dependent upon the first screw pitch and the second linear displacement being dependent upon the second screw pitch, whereby the optical fiber is moved with the holder an overall displacement corresponding to the sum of the first and second linear displacements, wherein
   a biasing element is radially arranged between said stationary housing and said ferrule holder to urge the ferrule holder forwardly; wherein
   said stationary housing is of a one-piece integrally formed type, and a discrete clip is inserted into said stationary housing to abut against a rear end of the biasing element.

2. The variable attenuator assembly as claimed in claim 1, wherein the variable attenuating connector further comprises a mounting member attached to the rear end of the stationary housing and defining an external-threaded section and a bore.

3. The variable attenuator assembly as claimed in claim 1, wherein the internal thread and the external thread of the knob are arranged such that the first and second displacements are in opposite directions whereby the overall displacement of the optical fiber relative to the stationary housing is the difference between absolute values of the first and second displacements.

4. The variable attenuator assembly as claimed in claim 1, further comprising an external housing mounted to a front end of the stationary housing for securing the variable attenuating connector to the coupling sleeve.

5. The variable attenuator assembly as claimed in claim 1, wherein the biasing element comprises a helical spring disposed between a front end of the ferrule holder and the clip inside the stationary housing.

6. The variable attenuator assembly as claimed in claim 1, wherein the connecting member forms two grooves which engagingly receive two holding beams formed at the rear end of the stationary housing.

7. The variable attenuator assembly as claimed in claim 1, wherein the ferrule holder has an enlarged front end forming a receptacle which receives and retains a ferrule to which the optical fiber is attached.

8. The variable attenuator assembly as claimed in claim 1, wherein the ferrule holder forms radially protruding stoppers engaging in keyways defined in sides of the stationary housing for preventing rotation of the holder relative to the stationary housing.

9. A variable attenuating connector (VAC) terminating a first optical fiber, comprising:
   a stationary housing defining a longitudinally extending bore and having a rear end;
   a connecting member attached to the rear end of the stationary housing and defining an internally-threaded bore;
   a tubular knob having an external thread of a first screw pitch and an internal thread of a second screw pitch, the first and second screw pitches being different from each other, the tubular knob being partially received in the connecting member with the external thread of the knob mating with the internally-threaded bore of the connecting member; and
   a ferrule holder defining a central bore adapted to receive and retain the first optical fiber therein, the holder being received in the tubular knob and the stationary housing and having an external thread mating with the internal thread of the knob;
   wherein rotating the knob induces a first linear displacement of the knob with respect to the connecting member and the stationary housing and a second linear displacement of the holder with respect to the knob, the first linear displacement being dependent upon the first screw pitch and the second linear displacement being dependent upon the second screw pitch, whereby the optical fiber is moved with the holder an overall displacement corresponding to the sum of the first and second linear displacements; wherein
   a biasing element is radially arranged between said stationary housing and said ferrule holder to urge the ferrule holder forwardly; wherein
   said stationary housing is of a one-piece integrally formed type, and a discrete clip is inserted into said stationary housing to abut against a rear end of the biasing element.

10. The variable attenuating connector as claimed in claim 9, further comprising a mounting member attached to the rear end of the stationary housing and defining an external-threaded section and a bore.

11. The variable attenuating connector as claimed in claim 9, wherein the internal thread and the external thread of the knob are arranged such that the first and second displacements are in opposite directions whereby the overall displacement of the optical fiber relative to the stationary housing is the difference between absolute values of the first and second displacements.

12. The variable attenuating connector as claimed in claim 9, further comprising an external housing mounted to a front end of the stationary housing for securing the variable attenuating connector to a coupling sleeve.

13. The variable attenuating connector as claimed in claim 9, wherein the biasing element comprises a helical spring disposed between a front end of the ferrule holder and the clip inside the stationary housing.

14. The variable attenuating connector as claimed in claim 9, wherein the connecting member forms two grooves which engagingly receive two holding beams formed at the rear end of the stationary housing.

15. The variable attenuating connector as claimed in claim 9, wherein the ferrule holder has an enlarged front end forming a receptacle which receives and retains a ferrule to which the optical fiber is attached.

16. The variable attenuating connector as claimed in claim 9, wherein the ferrule holder forms radially protruding stoppers engaging in keyways defined in the sides of the stationary housing for preventing rotation of the holder relative to the stationary housing.

17. A variable attenuator assembly for attenuating optical signals transmitted between first and second optical fibers, comprising:

a coupling sleeve open at opposite first and second ends;

a plug-type connector having the second optical fiber, being inserted into the coupling sleeve through said second end; and a variable attenuating connector having the first optical fiber, being inserted into the coupling sleeve through said first end, said variable attenuating connector comprising:
 a stationary housing retained in the coupling sleeve;
 a stationary connection member located around a rear portion of the stationary housing and providing an internally threaded bore therein;
 a rotatable tubular knob defining an external thread with a first screw pitch and an internal thread with a second screw pitch, the external thread engaged within the threaded bore of the stationary connection member; and
a non-rotating ferrule holder holding the fiber therewith and extending axially in the stationary housing and the rotatable tubular knob, said ferrule holder providing an external thread engaged with the internal thread of the knob; wherein
rotation of the knob results in an axial linear displacement of said ferrule holder in an amount being a difference between the first screw pitch and the second screw pitch; wherein
a biasing element is radially arranged between said stationary housing and said ferrule holder to urge the furrule holder forwardly; wherein
said stationary housing is of a one-piece integrally formed type, and a discrete clip is inserted into said stationary housing to abut against a rear end of the biasing element.

* * * * *